(12) United States Patent
Jhaveri (10) Patent No.: US 9,663,650 B2
(45) Date of Patent: *May 30, 2017

(54) WATER-BASED POLYMER EMULSIONS FOR OPAQUE FILMS AND COATINGS APPLICATIONS

(75) Inventor: Sarav Bharat Jhaveri, Lincoln Park, MI (US)

(73) Assignee: BASF SE, Ludwigshafen (DE)

( * ) Notice: Subject to any disclaimer, the term of this patent is extended or adjusted under 35 U.S.C. 154(b) by 418 days.

This patent is subject to a terminal disclaimer.

(21) Appl. No.: 14/241,050

(22) PCT Filed: Aug. 29, 2012

(86) PCT No.: PCT/US2012/052823
§ 371 (c)(1),
(2), (4) Date: Apr. 10, 2014

(87) PCT Pub. No.: WO2013/033181
PCT Pub. Date: Mar. 7, 2013

(65) Prior Publication Data
US 2014/0213691 A1 Jul. 31, 2014

Related U.S. Application Data (60) Provisional application No. 61/529,011, filed on Aug. 30, 2011.

(51) Int. Cl.
| | | |
|---|---|---|
| C08L 33/02 | (2006.01) | |
| C08L 43/00 | (2006.01) | |
| B32B 5/16 | (2006.01) | |
| B32B 9/00 | (2006.01) | |
| B32B 15/02 | (2006.01) | |
| B32B 17/02 | (2006.01) | |
| B32B 19/00 | (2006.01) | |
| B32B 21/02 | (2006.01) | |
| B32B 23/02 | (2006.01) | |
| B32B 27/02 | (2006.01) | |
| C08L 33/10 | (2006.01) | |
| C09D 4/00 | (2006.01) | |
| C08F 2/18 | (2006.01) | |
| C08F 2/22 | (2006.01) | |
| C09D 7/12 | (2006.01) | |
| C08F 257/02 | (2006.01) | |
| C08F 265/04 | (2006.01) | |
| C08F 212/08 | (2006.01) | |
| C09D 133/12 | (2006.01) | |
| C08L 25/06 | (2006.01) | |
| C09D 125/06 | (2006.01) | |
| C09D 133/10 | (2006.01) | |
| C08F 8/42 | (2006.01) | |

(52) U.S. Cl.
CPC .............. *C08L 33/10* (2013.01); *C08F 2/18* (2013.01); *C08F 2/22* (2013.01); *C08F 8/42* (2013.01); *C08F 212/08* (2013.01); *C08F 257/02* (2013.01); *C08F 265/04* (2013.01); *C08L 25/06* (2013.01); *C09D 4/00* (2013.01); *C09D 7/125* (2013.01); *C09D 125/06* (2013.01); *C09D 133/10* (2013.01); *C09D 133/12* (2013.01); *C08L 2201/52* (2013.01); *C08L 2205/02* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 4,427,836 A | | 1/1984 | Kowalski et al. |
| 4,468,498 A | | 8/1984 | Kowalski et al. |
| 4,496,620 A | | 1/1985 | Park et al. |
| 4,701,369 A | | 10/1987 | Duncan |
| 4,791,151 A | | 12/1988 | Kowalski et al. |
| 4,920,160 A | | 4/1990 | Chip et al. |
| 4,972,000 A | | 11/1990 | Kawashima et al. |
| 5,026,782 A | | 6/1991 | Biale |

(Continued)

FOREIGN PATENT DOCUMENTS

| | | | |
|---|---|---|---|
| CN | 102485755 A | | 6/2012 |
| JP | H02-070741 A | | 3/1990 |

(Continued)

OTHER PUBLICATIONS

Non-Final Office Action received for U.S. Appl. No. 14/241,048 mailed Mar. 7, 2016, 15 pages.
International Preliminary Report on Patentability received in Application No. PCT/US2012/052823 mailed Mar. 13, 2014 (10 pages).
International Preliminary Report on Patentability received in Application No. PCT/US2012/052831 mailed Mar. 13, 2014 (10 pages).
International Search Report and Written Opinion received in Application No. PCT/US2012/052823 mailed Feb. 1, 2013 (28 pages).
International Search Report received in Application No. PCT/US2012/052831 mailed Feb. 1, 2013 (4 pages).
First Office Action received in Chinese Patent Application No. 201280041811.5 issued Nov. 3, 2014, 12 pages—with English Translation.

(Continued)

*Primary Examiner* — Susannah Chung
*Assistant Examiner* — Robert T Butcher
(74) *Attorney, Agent, or Firm* — Foley & Lardner LLP (57) ABSTRACT

A process of preparing a water-based emulsion includes adding a first monomer feed to a reaction vessel in the presence of a first initiator and water to form an acid-functional polymer; neutralizing the acid-functional polymer to form a particulate polymer; and adding a second monomer feed to the reaction vessel in the presence of a second initiator to form an agglomerated polymer; where the process is a one-pot process. The first monomer feed includes a (meth)acrylate monomer, a (meth)acrylic acid monomer, and a styrenic monomer; the second monomer feed includes a hydrophobic monomer; the water-based emulsion includes the agglomerated polymer; the agglomerated polymer includes the particulate polymer; and the agglomerated polymer having an aggregated drupelet morphology. The agglomerated polymers may be used in high opacity emulsions.

5 Claims, 6 Drawing Sheets

(56) References Cited

U.S. PATENT DOCUMENTS

| | | | |
|---|---|---|---|
| 5,134,173 | A | 7/1992 | Joesten et al. |
| 5,912,294 | A | 6/1999 | Schade |
| 6,017,992 | A | 1/2000 | Haddleton et al. |
| 6,139,961 | A | 10/2000 | Blankenship et al. |
| 7,081,488 | B2 | 7/2006 | Bardman et al. |
| 2007/0065745 | A1 | 3/2007 | Gerroir et al. |
| 2010/0010118 | A1 | 1/2010 | Bardman |

FOREIGN PATENT DOCUMENTS

| | | |
|---|---|---|
| JP | 08-259701 | 10/1996 |
| JP | H10-060024 A | 3/1998 |
| JP | 3154477 B2 | 4/2001 |
| JP | 2009-507082 A | 2/2009 |
| JP | 2014-525503 A | 9/2014 |
| JP | 2014-529666 A | 11/2014 |
| KR | 10-1999-0060687 | 7/1999 |
| WO | WO-01/70892 | 9/2001 |

OTHER PUBLICATIONS

First Office Action received in Chinese Patent Application No. 201280042025.7 issued Nov. 3, 2014, 11 pages—with English Translation.
Extended European Search Report received in European Patent Application No. 12827163.2 mailed Apr. 2, 2015, 4 pages.
Extended European Search Report received in European Patent Application No. 12828245.6 mailed Apr. 10, 2015, 4 pages.
Final Office Action received for U.S. Appl. No. 14/241,048 mailed Jul. 14, 2016, 6 pages.
Non-Final Rejection in U.S. Appl. No. 14/241,048 mailed Nov. 3, 2016 (13 pages).
Notification of Reasons for Refusal in JP Application No. 2014-528541 mailed Sep. 26, 2016 (6 pages).
Notification of Reasons for Refusal in JP Application No. 2014-528543 mailed Sep. 26, 2016 (9 pages).
Notice of Allowance in U.S. Appl. No. 14/241,048, mailed on Mar. 10, 2017 (8 pages).

FIG. 5

WATER-BASED POLYMER EMULSIONS FOR OPAQUE FILMS AND COATINGS APPLICATIONS

CROSS REFERENCE TO RELATED APPLICATIONS

This application is a U.S. 371 National Stage Application of International Application No. PCT/US2012/052823, filed on Aug. 29, 2012, which in turn claims the benefit of U.S. Provisional Patent Application No. 61/529,011, filed on Aug. 30, 2011, the contents of both of which are incorporated herein by reference in their entirety for any and all purposes.

FIELD

The present technology generally relates to polymer-based coatings having high opacity.

BACKGROUND

Water-based emulsions leading to high opacity films and coatings are of interest for applications in various fields such as paints, inks, automotive coatings, fillers, etc. where hiding or opacity is required. In order to improve opacity in polymer emulsions, various approaches have been suggested such as incorporating inorganic materials (titanium dioxide, silicon dioxide, etc.) within the polymer or incorporation of air domains (hollow spheres) within the polymer particle to incorporate contrast of refractive indexes within the coating materials.

SUMMARY

In one aspect, a process of preparing a water-based emulsion having an agglomerated polymer includes adding a first monomer feed to a reaction vessel in the presence of a first initiator and water to form an acid-functional polymer; neutralizing the acid-functional polymer to form a particulate polymer; and adding a second monomer feed to the reaction vessel in the presence of a second initiator to form the agglomerated polymer; wherein the process is a one-pot process; the first monomer feed includes a (meth)acrylate monomer, a (meth)acrylic acid monomer, and a styrenic monomer; the second monomer feed includes a hydrophobic monomer, and optionally, a (meth)acrylate monomer; the agglomerated polymer includes the particulate polymer; and the agglomerated polymer has a drupelet morphology. In one embodiment, the particulate polymer has an average particle size of from about 1 nm to about 1000 nm. In any of the above embodiments, the agglomerated polymer may have an average particle size of from about 200 nm to about 3000 nm. In any of the above embodiments, the (meth)acrylate monomer includes methyl methacrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, trifluoroethyl (meth)acrylate, benzyl (meth) acrylate, 2-n-butoxyethyl (meth)acrylate, 2-chloroethyl (meth)acrylate, sec-butyl (meth)acrylate, tert-butyl (meth) acrylate, 2-ethylbutyl (meth)acrylate, cinnamyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, 3-methoxybutyl (meth) acrylate, 2-methoxybutyl (meth)acrylate, 2-nitro-2-methyl-propyl (meth)acrylate, n-octyl-(meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate, or tetrahydropyranyl (meth)acrylate. In any of the above embodiments, the (meth)acrylic acid monomer may include acrylic acid or methacrylic acid. In any of the above embodiments, the hydrophobic monomer includes styrene or α-methylstyrene. In any of the above embodiments, the first and second initiators individually include ammonium persulfate, potassium persulfate, sodium persulfate, tert-butyl hydroperoxide and dicumyl peroxide.

In any of the above embodiments, the neutralizing includes adding a base to the particulate polymer. In such embodiments, the base may include ammonia, sodium hydroxide, potassium hydroxide, methylamine, triethylamine, ethanolamine, or dimethylethanolamine.

In any of the above embodiments, the first monomer feed may be added in the absence of a surfactant.

In any of the above embodiments, the process may further include adding one or more of a surfactant, biocidal agent, dispersant, pigment, fillers, defoamer, wetting agent, light stabilizer, surface-active agent, thickener, or pigment stabilizer to the agglomerated polymer. In any of the above embodiments, the adding of the first monomer feed is conducted at a temperature from about 30° C. to about 100° C.

In any of the above embodiments, the particulate polymer has at least a first glass transition temperature of greater than 30° C. In some embodiments, the agglomerated polymer has at least a first glass transition temperature of greater than 30° C. and a second glass transition temperature of greater than 75° C. In some embodiments, the agglomerated polymer has at least a first glass transition temperature of from about 30° C. to about 90° C. and a second glass transition temperature of from about 50° C. to about 150° C. The agglomerated polymer may have at least a first Tg from about 50° C. to about 80° C. and a second glass transition temperature of from about 80° C. to about 120° C.

In another aspect, agglomerated polymer particles produced by any of the above processes, are provided.

In another aspect, an agglomerated polymer particle is provided that includes two or more primary polymer particles wherein the agglomerated polymer has an aggregated drupelet morphology. In some embodiments, the primary polymer particles include a neutralized (meth)acrylate-(meth)acrylic acid-styrenic co-polymer. In some embodiments, the two or more primary polymer particles are sequestered in the agglomerated polymer particle by a hydrophobic polymer. In some embodiments, the hydrophobic polymer is a styrenic polymer. In some embodiments, the particles have an average particle size of from about 200 nm to about 3000 nm. In some embodiments, the particles have an average particle size of from about 200 nm to about 700 nm. In some embodiments, the primary polymer particles have an average particle size of from about 1 nm to about 100 nm.

In another aspect, a coating is provided including an agglomerated polymer particle including two or more primary polymer particles wherein the agglomerated polymer has an aggregated drupelet morphology. In some embodiments, the coating may further include a surfactant, a biocidal agent, a drying agent, a dispersant, a pigment, a filler, a defoamer, a wetting agent, a light stabilizer, a surface-active agent, a thickener, a or a pigment stabilizer. In some embodiments, the agglomerated polymer particle is prepared by any of the above methods.

In another aspect, an emulsion is provided, the emulsion including an agglomerated polymer particle having a drupelet-like morphology and including a primary particle phase having a surfactant-free polymerization product of a (meth) acrylate monomer, a (meth)acrylic acid monomer, and a styrenic monomer; and a secondary particle phase having a polymerization product of a styrenic monomer, and, optionally, a (meth)acrylate monomer, where the primary particle phase has a smaller dimension than the secondary particle phase. In any of the emulsion embodiments, the primary particle phase may have an average particle size of from about 1 nm to about 1000 nm. This may include an average particle size of from about 200 nm to about 3000 nm. In any of the emulsion embodiments, the primary particle phase may have at least a first glass transition temperature of greater than −20° C. This may include the agglomerated polymer particle having at least a first glass transition temperature of greater than −20° C. and a second glass transition temperature of greater than 80° C.

BRIEF DESCRIPTION OF THE FIGURES

FIGS. 2A and 2B are AFM images of a dried, opaque particle emulsion according to the examples.

DETAILED DESCRIPTION

In the following detailed description, reference is made to the accompanying drawings, which form a part thereof. The illustrative embodiments described in the detailed description, drawings and claims are not meant to be limiting. Other embodiments may be utilized, and other changes may be made, without departing from the spirit or scope of the subject matter presented here. The present technology is also illustrated by the examples herein, which should not be construed as limiting in any way.

In one aspect, a process is provided for the synthesis of water-based emulsions for the use in high opacity films and coatings. The process includes a one-pot synthesis in at least two stages. The first stage includes water-based polymerization of an acid functional (i.e. hydrophilic) monomer and polymerization of a hydrophobic monomer, in the absence of a surfactant. Neutralization of the acid-functional polymer with a base is then followed by a second stage of polymerization with additional hydrophobic monomer(s). The second stage includes adding an initiator and a hydrophobic monomer, thereby starting a second polymerization process that produces a second polymer comprising the particulate polymer. Addition of a non-ionic surfactant during or at the end of feed 2 helps stabilize the emulsions. This second polymer is termed an agglomerated polymer.

The one-pot process results in the polymer particles agglomerating into composite particles having an aggregated drupelet morphology. As used herein, a one-pot process is defined as a multi-step reaction, where all reaction steps are conducted in the same reaction vessel. In the above one-pot process, both first and second stages occur in the same reaction vessel. Such a one-pot process is more efficient in terms of required equipment, cost, and consistency of the process and eventual product.

As used herein, an aggregated drupelet morphology is defined as resembling the surface of a raspberry or blackberry. As illustrated in FIGS. 1A, 1B, 2A, and 2B, the surface of the aggregated polymer resembles the surface of a raspberry or blackberry in that there are individual bumps or particles joined into a single, larger particle, and for which at least some of the individual members are readily discernable on the surface of the larger particles. The structures illustrated in FIGS. 1A, 1B, 2A, and 2B are more fully described below.

Coatings prepared with emulsions of the agglomerated drupelet particles exhibit an increased opacity, as compared to coatings that are not prepared with such particles. Without being bound by theory, it is believed that the agglomerated drupelet particles provide increased opacity due to one or more of the particles size of the agglomerated drupelet particles, the presence of air voids in the coating, or the increased pigment dispersability. For example, larger particle sizes of the agglomerated drupelet particles cause greater amount of light scattering in coatings. Additionally, the non-spherical nature of particles prevents tight packing of the particles in a coating, thereby causing air voids in the coatings. The presence of air voids in the coatings result in greater scattering of light due to higher contrast in refractive index between polymer and air, compared to polymer and polymer. Finally, the morphology of the latex particles may assist in the dispersability of the pigment particles, resulting in a more homogeneous distribution of the pigment within the coating. The agglomerated morphology of the particles having small hydrophilic domains on the surface of the larger agglomerated particles is believed to act as an effective pigment dispersant leading to the better dispersability of the pigment particles. The better the dispersion of pigment particles within the coating results in more distributed scattering centers (pigment particles) per unit volume of the coating resulting in higher scattering of light and improved opacity.

The first stage includes the product of the free radical polymerization of acrylates/methacrylates (hydrophilic monomers) and styrene (hydrophobic monomer) by adding a water-soluble initiator to produce smaller particle dispersions stabilized in water. After the end of first feed, the acid-functional dispersion is neutralized by a base. The polymerization of the first stage, followed by the neutralization step, results in the formation of drupelet-like particles that act as a seed for the second stage polymerization. During neutralization, the acid-rich phases become more water-soluble (hydrophilic) due to salt-formation resulting in migration of the neutralized acid-rich domains onto the surface of the multiphasic particles. The second stage includes the addition of further initiator and monomer to start a second polymerization, that leads to formation of larger drupelet-like particles. This technique results in emulsions with larger sized particles (e.g. >400 nm) with the morphology of a raspberry-type structure.

Figure 3A:
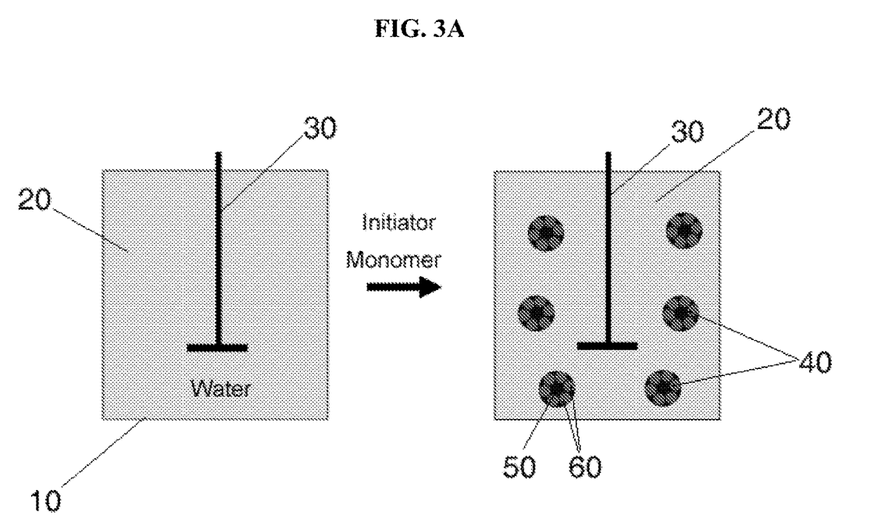
FIG. 3A is an illustration of a surfactant-free emulsion co-polymerization of hydrophobic and hydrophilic containing monomers leading to phase separation within the particle, according to various embodiments.

The general process is shown in the illustration presented in FIG. 3. In FIG. 3, a reaction vessel 10 is illustrated containing water 20 and an agitation or stirring apparatus 30 to form polymer particles 40, according to the first stage of the reaction. The first stage of the reaction is carried out as a surfactant-free emulsion polymerization of a hydrophilic monomer and a hydrophobic monomer. The hydrophilic and hydrophobic monomers polymerize to form polymer domains that are hydrophilic (acid-rich) 60 and hydrophobic (acid-poor) particles 50. The stoichiometry of the reaction is such that the hydrophobic domain 50 surrounds the hydrophilic domain 60 during the first stage.

Figure 3B:
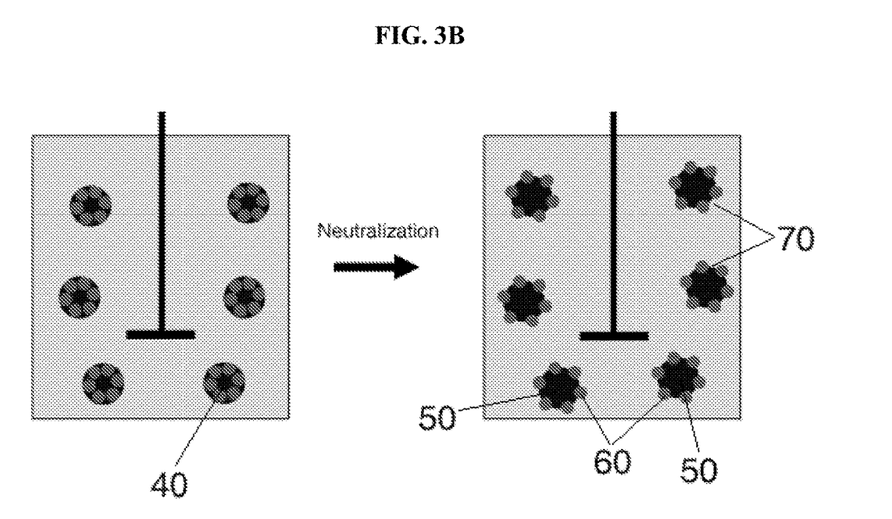
FIG. 3B is an illustration of the neutralization of the product prepared according to FIG. 3A, where the smaller sized hydrophilic polymer phase (smaller particles) migrate from the internal part of the particles to the surface of the polymers (to the water-polymer interface), according to various embodiments.
Figure 3C:
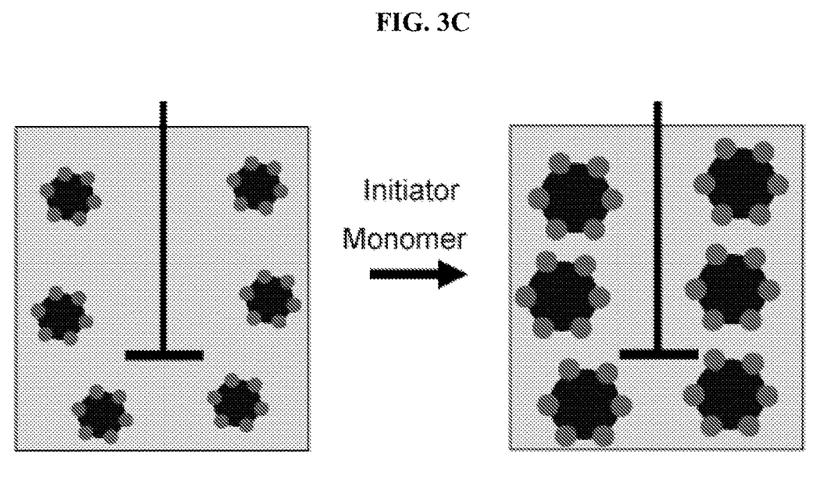
FIG. 3C is an illustration of the final stage of the polymerization from FIGS. 3A and 3B, wherein the polymerization with further hydrophobic monomer results in further growth of particle sizes resulting in large sized raspberry structured particle agglomerates, according to various embodiments.

After formation of the polymer particles under the surfactant-free conditions, the emulsion polymerization is neutralized by addition of a base, in a second stage. FIG. 3B illustrates the neutralization stage where the polymer particles 40 undergo an internal shift of the hydrophobic 50 and hydrophilic 60 domains. During neutralization, the hydrophilic phase 60 reacts with added base to form a neutral phase 70. After neutralization, the neutralized particles 70 are able to migrate to the surface of the hydrophilic particles 50, thereby forming a drupelet-like morphology. Further hydrophobic monomer addition results in further growth of the polymer particles (FIG. 3C).

When the first stage results in low molecular weight polymers in the hydrophobic phase, the hydrophilic particles are able to migrate into the water phase. Such polymerizations result in bi-modal size particles. That is, there are individual hydrophobic and hydrophilic particles in the product. However, when the molecular weight of the hydrophobic phase is high, the hydrophobic phase provides for adsorption of the hydrophilic particles to the surface of the hydrophobic phase, and into an agglomerated particle, having an overall rather uniform particle size. The increase in molecular weight of the hydrophobic phase prevents the neutralized hydrophilic phase (smaller particles) from being completely detached from the particle, resulting in the formation of aggregates that have a drupelet-like surface morphology. The morphology resembles that of a blackberry or raspberry, not only in shape but in surface definition, with at least a portion of the surface of at least some of the smaller polymer particles protruding from the surface to give the surface the characteristic "bumpy," "raspberry-like," or "blackberry-like" appearance.

As will be apparent, the hydrophilic polymer particles formed in the first stage are necessarily smaller than the agglomerated polymer particles. According to one embodiment, the hydrophilic particulate polymer prepared in the first stage has an average particle size of from about 1 nm to about 700 nm. In some embodiments, the hydrophilic polymer particles have an average size from about 50 nm to about 700 nm. In some embodiments, the hydrophilic polymer particles have an average size from about 50 nm to about 250 nm. In some embodiments, the hydrophilic polymer particles have an average size from about 50 nm to about 100 nm. The agglomerated polymer particles may have an average particle size of from about 100 nm to about 3 µm. For example, in one embodiment, the agglomerated polymer particles have an average particle size of from about 200 nm to about 1 µm. In other embodiments, the agglomerated polymer particles have an average particle size of from about 300 nm to about 700 nm. In some embodiments, the agglomerated polymer particles contain at least two of the polymer particles of the first stage.

Figure 4:
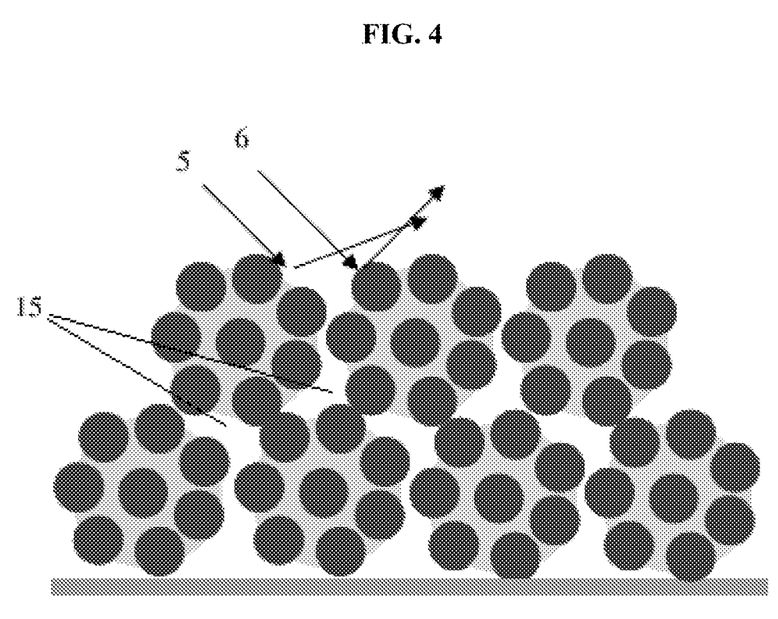
FIG. 4 is an illustration of a coating, produced with the agglomerated polymer particles, interacting with light to show the scattering potential, according to various embodiments.

Without being bound by theory, it is believed that it is the agglomerated drupelet morphology that produces the desired opacity of the present materials, when they are employed in a coating capacity. Opacity in films is controlled by the amount of light that is scattered by the particles within the film, and the contrast in the refractive indices of the different mediums within the films. The drupelet-like morphology assists in causing large amounts of scattering and thus providing higher opacities. As illustrated in FIG. 4, when incident light beams 5, 6 interact with the surface of the particles in the coating at different points, the light is reflected, and scattering occurs. The scattering results in a loss of optical clarity and an opaque appearance of the coating. Other physical features of the coating and agglomerated polymer particles also have a bearing on the degree of opacity. For example, polymer particles that remain discreet polymer particles at operating temperatures of the coating provide for greater opacity.

The hydrophilic polymer particles and the hydrophobic polymer particles have different glass transition temperatures (Tg), when measured using a differential scanning calorimeter (DSC). The different Tg for the two phases is indicative of the phase separation within the particle. In some embodiments, the hydrophobic polymer of the agglomerated polymer particles and particulate polymers have $T_g$ (glass transition temperature) values that are greater than the highest temperature to which the coating will be exposed. This may be a $T_g$ greater than room temperature, or greater than 50° C., or even greater than 100° C. In some embodiments, the hydrophobic polymer of the agglomerated polymer particles has a $T_g$ from about 30° C. to about 150° C. In some such embodiments, the hydrophobic polymer of the agglomerated polymer particles has a $T_g$ from about 50° C. to about 150° C. In some such embodiments, the hydrophobic polymer of the agglomerated polymer particles has a $T_g$ from about 75° C. to about 120° C. The primary particles, i.e. the hydrophilic particulate polymers may have the same $T_g$ as the hydrophobic polymer of the agglomerated polymer particles has, or the $T_g$ of the primary particles may be different providing for a two-phase transition of the agglomerated polymer particles. Thus, in some embodiments, the primary polymer particles have a $T_g$ from about 30° C. to about 100° C. In some such embodiments, the primary polymer particles have a $T_g$ from about 50° C. to about 80° C. In some such embodiments, the primary polymer particles have a $T_g$ from about 75° C. to about 120° C. Where the $T_g$ is below the operating temperature of the coating, such as below ambient or room temperature, the particulate polymers and the agglomerated polymers begin to lose their shape and coalesce, thereby allowing light to pass through without scattering. In such cases, low opacity, or even transparent coatings may be formed.

As noted, the agglomerated particles may have at least two Tg values with one for the hydrophilic primary particles and one for the hydrophobic phase. Accordingly, in some embodiments, the agglomerated polymer has at least a first glass transition temperature of greater than 30° C. and a second glass transition temperature of greater than 75° C. In some embodiments, the agglomerated polymer has at least a first glass transition temperature of from about 30° C. to about 90° C. and a second glass transition temperature of from about 50° C. to about 150° C. The agglomerated polymer may have at least a first Tg from about 50° C. to about 80° C. and a second glass transition temperature of from about 80° C. to about 120° C.

Another physical feature of the coating and agglomerated polymer particles that has a bearing on the degree of opacity is the number and size of the void areas between the particles. Void areas between particles are those areas that are not filled by particles, due to the particle shape. Illustrative void areas are described by reference number 15 in FIG. 4. To the extent that light is able to pass through enough of the coating and particles to encounter a void area, the void area provides additional surfaces on which the light may be reflected and scattered. Further scattering may then occur in reflected light as it attempts to exit the coating, or is refracted through the coating. The void areas are created due to the irregular packing of the particles as they are applied in a coating to the surface of a substrate, and as the coating cures on the surface. The irregular shapes of the agglomerated polymer particles leads to irregular packing and a more randomized surface to enhance light scattering. More void areas leads to greater opacity.

The high opacity and hiding ability of coatings employing the agglomerated polymer particles is attributed to the polymers and morphologies described. Additives or pigments that are traditionally used for increasing the opacity and hiding ability of a coating are not required, although they may be used. However, exclusion of such additives may provide for lower cost coatings.

Opacity, as used herein, is defined as the ability of a coating to prevent the transmission of light. To quantify and compare opacity or hiding power of the various emulsions and their coating(s), contrast ratios of the dried coating(s) were measured on Leneta cards (contrast of the coating between white and black background). The opacity was then rated visually on a scale of 0-5 with 5-being best in opacity and 0 being worst in opacity. Coatings using the agglomerated particles emulsions typically exhibit a contrast ratio on Leneta card of greater than 30% (contrast ratio ranged between 10% and 80%) and visual rating of greater than or equal to 4.

In the first stage of the two-stage process, acrylate or (meth)acrylate monomers, acrylic or methacrylic acid (i.e. hydrophilic monomers), and styrenic monomers (i.e. hydrophobic monomers) are added to a reaction vessel (i.e. the pot) in an aqueous medium in the presence of a free-radical initiator. The second stage also includes addition of a styrenic monomer. Suitable acrylate or (meth)acrylate monomers for use in the monomer addition of the first stage include, but are not limited to, methyl methacrylate, ethyl (meth)acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, trifluoroethyl (meth)acrylate, benzyl (meth)acrylate, 2-n-butoxyethyl (meth)acrylate, 2-chloroethyl (meth)acrylate, sec-butyl (meth)acrylate, tert-butyl (meth)acrylate, 2-ethylbutyl (meth)acrylate, cinnamyl (meth)acrylate, cyclohexyl (meth)acrylate, cyclopentyl (meth)acrylate, 2-ethoxyethyl (meth)acrylate, furfuryl (meth)acrylate, hexafluoroisopropyl (meth)acrylate, 3-methoxybutyl (meth)acrylate, 2-methoxybutyl (meth)acrylate, 2-nitro-2-methylpropyl (meth)acrylate, n-octyl-(meth)acrylate, 2-ethylhexyl (meth)acrylate, 2-phenoxyethyl (meth)acrylate, 2-phenylethyl (meth)acrylate, phenyl (meth)acrylate, propargyl (meth)acrylate, tetrahydrofurfuryl (meth)acrylate, and tetrahydropyranyl (meth)acrylate. As used herein, the "meth" in parentheses before acrylic or acrylate is used to designate either the methacrylic or acrylic, or the methacrylate or acrylate compound. Suitable styrenic monomers for use in the monomer addition of the first or second stages include, but are not limited to, styrene and α-methylstyrene. Suitable (meth)acrylates that may optionally be added during the second stage include the unbranched and branched (meth)acrylates described above. One (meth)acrylate that may optionally be used in the second stage is ethylhexylacrylate.

As noted above, after the first stage is complete, a base is added. The addition of the base is intended to neutralize the acid functional polymer that is produced in the first stage. Suitable bases include, but are not limited to, ammonia, sodium hydroxide, potassium hydroxide, methylamine, triethylamine, ethanolamine, and dimethylethanolamine. The base may be added in less than stoichiometric amounts, or in stoichiometric amounts or in an amount that is a slight stoichiometric excess. The partial, or complete, neutralization of the acid-containing first stage polymer results in some, or all, of the polymer particles generated in the first stage polymer to increase in their hydrophilic character. The second stage of polymerization of the hydrophobic polymer following the base neutralization of the first stage polymer results in two different polymer particles species that are sequestered together forming the agglomerated particle.

The initiators used in either the first stage or the second stage may be those as are commonly used for free-radical polymers and which are water soluble. Suitable initiators include, but are not limited to, ammonium persulfate (APS), potassium persulfate (PPS), sodium persulfate, tert-butyl hydroperoxide (TBHP), dicumyl peroxide, hydrogen peroxide, and the like.

Other additives that may then be added to the emulsions include additives such as, but not limited to, surfactants, biocidal agents; drying agents; dispersants; pigments; fillers such as a clay, calcium carbonate, and the like; defoamers; wetting agents; light stabilizers; surface-active agents; thickeners; and pigment stabilizers. As used herein, biocidal agents are materials that prevent or inhibit the growth of bacteria, viruses, fungi, or other biological fouling agents in the emulsions or products prepared with or from such emulsions. As used herein, drying agents, are materials added to a coating or emulsion to enhance the drying speed of the coating. As used herein, dispersants are materials that are added to a coating or emulsion to prevent or minimize setting of the emulsions or coatings after formation. As used herein, light stabilizers prevent, or minimize, degradation of the polymers by exposure to various light sources, including ultra violet light. As used herein, surface-active agents are materials that are added to the emulsion in order to stabilize emulsions. As used herein, thickeners are materials that are added to the emulsion to increase the viscosity of the emulsion. As used herein, pigment stabilizers are materials that are added to stabilize a pigment from fading and degradation.

According to one embodiment, the first stage of the process is conducted at elevated temperature. For example, the temperature may range from about 30° C. to about 100° C. In some embodiments, the temperature at which the first stage is conducted is from about 60° C. to about 90° C. The second stage may be conducted in similar temperature ranges. In some embodiments, the second stage is conducted at substantially the same temperature as the first stage. This is noted to be "substantially," because, as those of skill in the art will understand, the temperature of the reaction vessel during addition of monomers, additional water, or other additives, may fluctuate slightly over time, or due to variation in thermostatted heating devices or baths.

The weight average molecular weight ($M_w$) of the polymer particles produced in the first stage of the process is from about 5,000 g/mol to about 1,000,000 g/mol. In some such embodiments, the $M_w$ of the polymer particles produced in the first stage of the process is from about 200,000 g/mol to about 300,000 g/mol. The $M_w$ of the hydrophobic polymer in the agglomerated polymer particles produced in the second stage of the process is from about 5,000 g/mol to about 1,000,000 g/mol. In some such embodiments, the $M_w$ of the hydrophobic polymer in the agglomerated polymer particles produced in the second stage of the process is from about 200,000 g/mol to about 300,000 g/mol.

As will be observed from the examples, the process may include one or more holding, or equilibration, periods. Such periods may range from a minute or two to several minutes or hours. The holding, or equilibration, periods (the terms are used interchangeably), are for allowing completion of the reaction and/or for allowing the reaction mixture to be homogeneously dispersed.

In view of the neutralization of the acid functional polymer particles in the first stage, and the polymerization of a non-acid functional, hydrophobic monomer in the second stage, the final pH of the emulsion that is produced in the process is near neutral. In some embodiments, the pH of the water-based emulsion that is produced is from about 6 to about 8. In some such embodiments, the pH is from about 7 to about 7.5.

After the reaction is completed and the reaction mixture is cooled to room temperature, the emulsion is filtered.

Because the water-based emulsions are to be used in coatings, according to one embodiment, the viscosity of the water-based emulsion is one parameter that may be monitored or adjusted to provide for different flow rates, application conditions, and the like. The viscosity may be increased by increasing the solids content of the water-based emulsion, or thickeners may be added to the emulsion to provide an increase in viscosity. In either event, the viscosity may be targeted to a value from about 50 cps to about 2,000 cps.

Figure 1A:
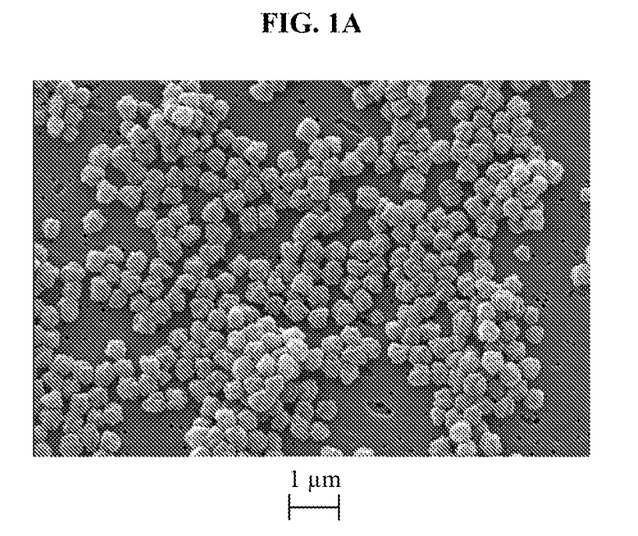
FIGS. 1A and 1B are SEM images of a dried, opaque particle emulsion according to the examples.
Figure 1B:
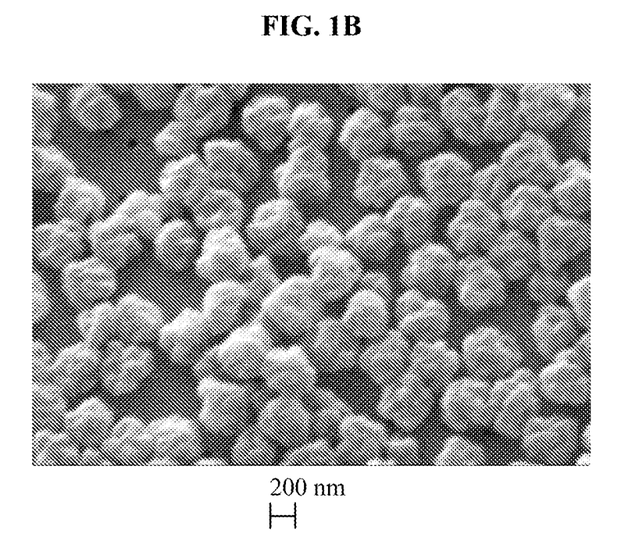
Figure 2:
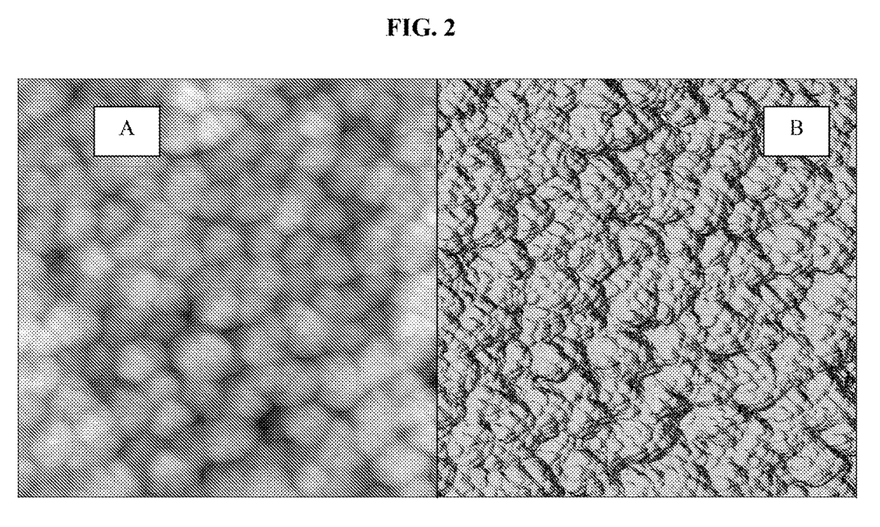
FIG. 2A is a height image and FIG. 2B is a phase image.

In another aspect, the agglomerated polymers described above are provided. As noted above, the agglomerated polymer particles have both a primary structure and a secondary structure. The primary structure is the particulate polymer formed during the first stage and includes a neutralized (meth)acrylate-(meth)acrylic acid-styrenic co-polymer having a small particle size. During the second stage the secondary structure is formed and includes agglomeration of the primary particles into an aggregated drupelet morphology. FIGS. 1A and 1B include scanning electron microscope (SEM) images of the agglomerated particles, with FIG. 1B being a magnification of FIG. 1A. The surface detail of the particles is illustrated in the atomic force microscope (AFM) images of FIGS. 2A and 2B. As described above, and without being bound by theory, it is believed that such a surface provides the basis for the opacity of such polymers when used as a coating, without the need for additional hiding or whitening pigments or other additives present.

Accordingly, in one embodiment, an agglomerated polymer particle is provided, including a host, hydrophobic polymer including at least two smaller polymer particles, the agglomerated polymer particle having an aggregated drupelet morphology.

Emulsions of any of the above prepared agglomerated polymer particles are also provided. The emulsions may include an agglomerated polymer particle having a drupelet-like morphology. The agglomerated polymer particles include a primary particle phase that is the surfactant-free polymerization product of a (meth)acrylate monomer, a (meth)acrylic acid monomer, and a styrenic monomer; and a secondary particle phase that is the polymerization product of a styrenic monomer, and, optionally, a (meth)acrylate monomer. These agglomerated polymer particles are those as described above having the dimensions, molecular weights, and glass transition temperatures discussed above.

In another aspect a coating is provided that includes the agglomerated polymer particles described above. The coating may be a paint, an ink, primer, sizing agent, overprint varnish, or other like coating. The coatings provides for a high opacity without the addition of other opacity enhancing additives such as pigments. However, such opacity enhancing additives may be included in coating formulations to further enhance the opacity, whitening, or hiding effects of the coating. Such coatings may include agglomerated polymer particles having a hydrophobic polymer including at least two smaller polymer particles, the agglomerated polymer particle having an aggregated drupelet morphology. The coatings may also include dispersants, pigments or other additives.

The coatings may include a wide variety of additives such as, but not limited to, surfactants, biocidal agents; drying agents; dispersants; pigments; fillers such as a clay, calcium carbonate, and the like; defoamers; wetting agents; light stabilizers; surface-active agents; thickeners; and pigment stabilizers, as described above. Pigments of all colors and type may be used, as long as they are compatible with the water-based emulsion coating.

Where the coating includes a pigment, the opaque coatings formed with the agglomerated polymer particles exhibit an improvement in hiding. For example, where conventional water-based emulsions are used, colored substrates tend to show through a single coating of the material, whereas where the opaque coatings are used, the show-through of the substrate is minimal or non-existent.

Such coatings may, of course, be applied to a substrate. Illustrative substrates include, but are not limited to, paper, plastic, wood, concrete, ceramics, and glass. For example, the substrate may include, but is not limited to, Kraft paper, newsprint, flexible plastic packaging, cellulosic papers, plastic-coated papers, cardboard, and the like.

The present technology, thus generally described, will be understood more readily by reference to the following example, which is provided by way of illustration and is not intended to limit the present technology.

EXAMPLES

Example 1

Water (341.56 g) is heated to 85° C. in a reactor with stirring. Ammonium persulfate (APS, 1.08 g) dissolved in water (9.00 g) is added to the reactor, followed by a monomer feed (a mixture of ethyl acrylate (47.50 g), methacrylic acid (23.46 g), methyl methacrylate (16.70 g), and styrene (50.20 g) over a period of 25 minutes. Upon completion of the addition of the monomer feed, the feed tank was flushed with water (10.00 g) and the reaction was allowed to equilibrate for 5 minutes. Ammonia (28% solution in water, 18.70 g) diluted with water (27 g) was then added to the reactor over a period of 5 minutes, and again the reaction mixture was allowed to equilibrate for an addition 5 minutes. A second addition of APS (1.51 g) dissolved in water (14.00 g) was then added to the reactor. A second monomer feed (styrene; 200.0 g) was then slowly added with stirring over a period of 35 minutes. Upon completion of the addition of the second monomer feed, the feed tank was then flushed with water (10.00 g). Tert-butyl hydroperoxide (70% solution in water, 1.73 g) diluted with water (18.0 g) was then added to the reactor. After 10 minutes, sodium erythorbate (12% solution in water, 2.52 g) diluted with 7.78 g water was added to the reactor over a period of 5 minutes. The reaction was then allowed to equilibrate for 10 minutes, water (14.42 g) was added, and the reaction was cooled to 60° C. Pluronic P-1200 (polyethylene glycol, 6.83 g, BASF) and Acticide MBS (preservative, 0.42 g) were added. The reaction was then cooled to room temperature and the emulsion was filtered. The emulsion had a pH of 8.53, a viscosity of 890 cps, and an average particle size of 450 nm.

Example 2

Synthesis procedure for a molecular weight ladder study on effect of chain transfer. Water (339.85 g) is heated to 85° C. in a reactor with stirring. Add 15% of the materials (see Table 1) of the first monomer feed to the reactor and hold for 2 minutes. APS (1.62 g) dissolved in water (12.87 g) was then added to the reactor. After 5 minutes, the remainder of first monomer feed was added over a period of 45 minutes. Upon completion of the addition of the monomer feed, the feed tank was flushed with water (8.31 g) and the reaction was allowed to equilibrate for 3 minutes. Ammonia (28% solution in water, 8.25 g) diluted with water (40.18 g) was then added to the reactor over a period of 10 minutes. A second addition of APS (2.27 g) dissolved in water (15.46 g) was then added to the reactor. A second monomer feed (styrene (200.0 g)) was then slowly added with stirring over a period of 60 minutes. Upon completion of the addition of the second monomer feed, the feed tank was then flushed with water (4.57 g). Tert-butyl hydroperoxide (70% solution in water, 1.73 g) diluted with water (20.23 g) was then added to the reactor. After 10 minutes, sodium erythorbate (12% solution in water, 2.52 g) diluted with 9.57 g water was added to the reactor over a period of 5 minutes. Pluronic P-1200 (polyethylene glycol, 6.83 g) and Acticide MBS (preservative, 0.41 g), diluted with water (11.25 g) were added. The reaction was then cooled to room temperature and the emulsion was filtered.

TABLE 1

Monomer Feeds (MF) For Example 2.

| Monomer Feed | Monomer | Example 2-1 | Example 2-2 | Example 2-3 |
|---|---|---|---|---|
| 1 | Ethyl acrylate | 47.50 | 47.50 | 47.50 |
| | Methacrylic acid | 23.46 | 23.46 | 23.46 |
| | Methyl methacrylate | 6.70 | 6.70 | 6.70 |
| | Styrene | 60.20 | 60.20 | 60.20 |
| | Butyl 3-mercaptopropionate | — | 1.0 | 2.0 |
| Total of Monomer Feed | | 137.86 | 138.26 | 139.26 |
| 2 | Styrene | 200.0 | 200.0 | 200.0 |
| Tg/Tg (° C., DSC) | | | 70/104 | |
| Tg/Tg (° C., calc.)* | | 59.53/105 | 59.53/105 | 59.53/105 |

*The calculated Tg are determined by the Fox-Flory Equation.

Figure 5:
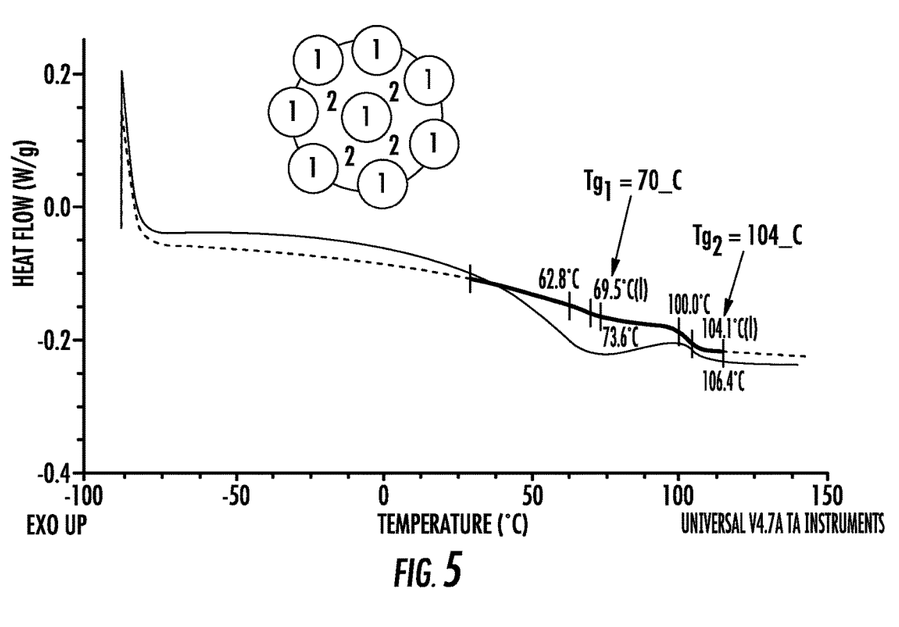
FIG. 5 is a DSC trace for Example 2-1.

As a subjective observation, the opacity of films on corrugated paper was measured. Example 2-1, without a chain transfer agent (CTA; i.e. the butyl-3-mercaptopropionate) had significantly higher opacity than either 2-2 or 2-3, and 2-2 displayed a greater opacity than Example 2-3. FIG. 5 shows the DSC (differential scanning calorimetry) trace for Example 2-1, which clearly shows two Tg values. The lower value corresponds to the Tg for the primary hydrophilic polymer particles and the higher value corresponds to the Tg for the hydrophobic polymer.

Example 3

Water (340.40 g) was heated to 82° C. in a reactor with stirring. After addition of about 15 wt % of the monomer feed (20.59 g of the mixture of ethyl acrylate (47.30 g), methacrylic acid (23.36 g), methyl methacrylate (6.67 g), and styrene (59.94 g)), and a one minute hold, APS (1.61 g) dissolved in water (12.82 g) was added to the reactor. After a wait period of 5 minutes, the remaining monomer feed is added over a period of 45 minutes. Upon completion of the addition of the monomer feed, the feed tank was flushed with water (8.27 g). Ammonia (28% solution in water, 9.71 g) diluted with water (35.92 g) was then added to the reactor over a period of 10 minutes, and again the reaction mixture was allowed to equilibrate for an addition 2 minutes. Tert-butyl hydroperoxide (70% solution in water, 1.72 g) diluted with water (16.18 g) was then added to the reactor. A second addition of APS (2.26 g) dissolved in water (15.41 g) was then added to the reactor. Feed monomer feed 2 slowly with stirring into reactor from monomer feed tank over a period of 65 minutes. Upon completion of the addition of the second monomer feed, the feed tank was then flushed with water (4.55 g). The reaction mixture was then held for 5 minutes, and water (5.34 g) was added. After holding for 5 minutes, sodium erythorbate (12% solution in water; 2.51 g) was then diluted with water (9.43 g) and the solution added to the reactor over 5 minutes, and the mixture was then held for an additional 5 minutes. Cooling water (5.34 g) is then added to the reactor. Pluronic P-1200 (polyethylene glycol, 6.80 g) diluted with water (5.34 g) and Acticide MBS (preservative, 0.40 g) diluted with water (4.45 g), was then added to the reactor. The reactor was cooled to room temperature and the emulsion was filtered. Particle size determination was by three independent means: SEM, AFM, and dynamic light scattering (DLS).

The properties of the emulsion formed in Example 3 are as follows:

Total batch size=800 g;

Non-volatile materials=40.13%;

pH=7.80

Viscosity (#2 spindle, 30 rpm, 30 sec)=70 cps;

MW (GPC in THF)=223,782 g/mol;

Residual monomers: EA, MMA, STY are all less than 0.0005% (Below detectable limit), MAA=0.027%;

Particle Size (PS)=480 nm (DLS), 490 nm (SEM), 500 nm (AFM); and Tg=87.4° C., 104.6° C. (two phases).

A gel permeation chromatogram of the material produced in Example 3 was obtain. The properties of the GPC study in the polymer of Example 3 are provided in Table 2, below.

TABLE 2

Gel Permeation Chromatography Results:

| Example | Mn | Mw | MP | Mz | Mz + 1 | P.D. Mz/Mw | Mz/Mw | Mz + 1/Mw |
|---|---|---|---|---|---|---|---|---|
| 3 | 29509 | 223782 | 61958 | 993728 | 1870883 | 7.58 | 4.44 | 8.36 |

Examples 4A-4F

The general procedure is shown by Example 4A, with the amounts presented here and in Table 3. Examples 4B-4F were similarly prepared according to the amounts in Table 3. Water (270.54 g) was heated to 82° C. in a reactor with stirring. After addition of about 15 wt % of the first monomer feed (16.43 g of the mixture of ethyl acrylate (37.74 g), methacrylic acid (18.64 g), methyl methacrylate (5.33 g), and styrene (47.84 g)), and a one minute hold, APS (1.29 g) dissolved in water (11.37 g) was added to the reactor. After a wait period of 5 minutes, the remaining first monomer feed is added over a period of 45 minutes. Upon completion of the addition of the monomer feed, the feed tank was flushed with water (8.00 g). Ammonia (28% solution in water, 7.75 g) diluted with water (27.59 g) was then added to the reactor over a period of 10 minutes, and again the reaction mixture was allowed to equilibrate for an addition 2 minutes. Tert-butyl hydroperoxide (70% solution in water, 1.38 g) diluted with water (8.00 g) was then added to the reactor. A second addition of APS (1.81 g) dissolved in water (13.44 g) was then added to the reactor. A second monomer feed of styrene (139.07 g) was added slowly with stirring into reactor from monomer feed tank over a period of 65 minutes. Upon completion of the addition of the second monomer feed, the feed tank was then flushed with water (5.34 g). The reaction mixture was then held for 5 minutes, and water (5.34 g) was added. After holding for 5 minutes, sodium erythorbate (12% solution in water; 2.01 g) was then diluted with water (5.05 g) and the solution added to the reactor over 5 minutes, and the mixture was then held for an additional 5 minutes. The reaction was then allowed to start cooling and at 70° C., Pluronic P-1200 (polyethylene glycol, 5.42 g), Pluronic F-127 (a ethylene oxide-propylene oxide polymer; 97.69 g of a 13% solution), and Joncryl 646 (styrene acrylic thickener colloid emulsion; 63.85 g) was added, followed by a flush with water (10.68 g). After holding for 10 minutes at 50° C., acticide MBS (preservative, 0.40 g) diluted with water (4.45 g), was added to the reactor. Cooling was then continued to room temperature and the emulsion was filtered.

Example 5

Ink preparation. The opaque polymer emulsion of Example 1 (52.0 g) was mixed under stirring with a water-based, blue pigment dispersion (Flexiverse BFD purchased from Sun Chemicals 1121/P044; 40.0 g), a wax (Joncryl Wax 4, 2.0 g), a defoamer (EFKA 2580, available from Efka Chemicals; 0.5 g) and water (5.5 g). The total formulation was 100 g. Other inks may be prepared with any of the above emulsions. The opaque polymer emulsions were then applied to different paper substrates and the opacity measured. The formulations were applied to the substrates with a draw down bar.

The ink prepared in Example 5 gave an opacity reading (contrast ratio measured on black and white sections of a Leneta card) measured for a 2 um thick film emulsion draw down with a K1 meter bar for the control of about 38.33%. Opacity values for neat emulsions, such as Example 1, are typically greater than 30% for films thickness from about 2 μm to about 20 μm. As used herein, opacity is defined as the ability of a coating to prevent the transmission of light, and it is presented in units of % which are based upon contrast ratio measured on black and white sections of a Leneta card. The high opacity inks with the agglomerated polymer particles exhibit higher opacity and better hiding and they allow for the use of lower amounts of pigments to achieve desired opacity levels.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or

TABLE 3

Reactant Amounts And Properties For Examples 4.

| Monomer | 4A | 4B | 4C | 4D | 4E | 4F |
|---|---|---|---|---|---|---|
| *First Monomer Feed* | | | | | | |
| Ethyl acrylate (g) | 37.74 | 37.74 | 37.74 | 40.74 | 37.74 | 37.74 |
| Methacrylic acid (g) | 18.64 | 18.64 | 18.64 | 18.64 | 18.64 | 18.64 |
| Methyl methacrylate (g) | 5.33 | 5.33 | 5.33 | 5.33 | 10.33 | 5.33 |
| Styrene (g) | 47.84 | 47.84 | 37.84 | 44.84 | 42.84 | 47.84 |
| $2^{nd}$ *Monomer Feed* | | | | | | |
| Styrene (g) | 139.07 | 106.21 | 139.07 | 139.07 | 139.07 | 129.07 |
| 2-Ethylhexylacrylate (g) | — | — | — | — | — | 10.00 |
| Pluronic P-1200 (g) | 5.42 | — | 5.42 | 5.42 | 5.42 | 5.42 |
| Pluronic F-127 (13% solution) (g) | 97.69 | — | 97.69 | 97.69 | 97.69 | 97.69 |
| *Properties* | | | | | | |
| Batch Size (g) | 800 | | | | | |
| Non-volatiles (%) | 36.90 | | | | | |
| pH | 7.24 | | | | | |
| Viscosity (#2 spindle, 30 rpm, 30 seconds) (cps) | 599 | | | | | |
| Tg/Tg (° C., calc. by Fox-Flory Equation) | 59.54/105 | 59.54/105 | 55.57/105 | 55.44/105 | 59.54/105 | 59.54/85.46 | biological systems, which can of course vary. It is also to be understood that the terminology used herein is for the purpose of describing particular embodiments only, and is not intended to be limiting.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While certain embodiments have been illustrated and described, it should be understood that changes and modifications can be made therein in accordance with ordinary skill in the art without departing from the technology in its broader aspects as defined in the following claims.

What is claimed is:

1. An ink for coating a paper substrate, the ink comprising a pigment and an agglomerated polymer particle comprising two or more primary particles;
   wherein:
   each primary particle has a drupelet morphology and comprises a neutralized co-polymer;
   the two or more primary particles are sequestered in the agglomerated polymer particle by a hydrophobic polymer, wherein the hydrophobic polymer consists of one or more hydrophobic monomers; and
   the agglomerated polymer particle has an aggregated drupelet morphology.

2. The ink of claim 1, wherein the agglomerated polymer particle is prepared by a process comprising:
   adding a first monomer feed to a reaction vessel in the presence of a first initiator and water to form an acid-functional polymer;
   neutralizing the acid-functional polymer to form the two or more primary particles; and
   adding a second monomer feed to the reaction vessel in the presence of a second initiator to form the agglomerated polymer particle;
   wherein:
   the process is a one-pot process;
   the first monomer feed comprises an unbranched (meth)acrylate monomer, a (meth)acrylic acid monomer, a branched (meth)acrylate monomer, and a styrenic monomer; and
   the second monomer feed consists of one or more hydrophobic monomers.

3. The ink of claim 1, wherein the two or more primary particles comprise a neutralized (meth)acrylate-(meth)acrylic acid-styrene co-polymer.

4. The ink of claim 1, wherein the hydrophobic polymer is a styrenic polymer.

5. The ink of claim 1, wherein the agglomerated polymer particle has an average particle size of from about 200 nm to about 3000 nm.

* * * * *